United States Patent
Mindrum

(10) Patent No.: US 9,200,469 B1
(45) Date of Patent: Dec. 1, 2015

(54) SYSTEM AND METHOD FOR LOCATING AN UNMARKED BURIAL SITE

(75) Inventor: Gordon Scott Mindrum, Cincinnati, OH (US)

(73) Assignee: MAKING EVERLASTING MEMORIES, L.L.C., Cincinnati, OH (US)

( * ) Notice: Subject to any disclaimer, the term of this patent is extended or adjusted under 35 U.S.C. 154(b) by 0 days.

(21) Appl. No.: 13/517,679

(22) Filed: Jun. 14, 2012

Related U.S. Application Data

(60) Provisional application No. 61/497,333, filed on Jun. 15, 2011.

(51) Int. Cl.
*G06F 17/00* (2006.01)
*E04H 13/00* (2006.01)

(52) U.S. Cl.
CPC .................................... *E04H 13/003* (2013.01)

(58) Field of Classification Search
USPC .......... 235/375, 451, 462.01, 462.09, 462.45, 235/462.46, 462.49, 472.01–472.03, 492
See application file for complete search history.

(56) References Cited

U.S. PATENT DOCUMENTS

| | | | |
|---|---|---|---|
| 5,696,488 A * | 12/1997 | Assisi | 340/539.11 |
| 6,340,978 B1 | 1/2002 | Mindrum | |
| 6,947,921 B2 * | 9/2005 | Notargiacomo et al. | 1/1 |
| 7,014,101 B1 * | 3/2006 | Kennedy | 235/375 |
| 7,222,120 B1 | 5/2007 | Mindrum | |
| 7,254,666 B2 * | 8/2007 | Toothman et al. | 711/100 |
| 7,287,225 B2 | 10/2007 | Mindrum | |
| 7,624,344 B2 | 11/2009 | Mindrum et al. | |
| 7,657,835 B2 | 2/2010 | Mindrum et al. | |
| 8,522,155 B2 | 8/2013 | Mindrum | |
| 2004/0085337 A1 * | 5/2004 | Barrows | 345/717 |
| 2004/0148282 A1 * | 7/2004 | Gardiner | 707/3 |
| 2007/0152058 A1 * | 7/2007 | Yeakley et al. | 235/462.01 |
| 2007/0260610 A1 | 11/2007 | Mindrum | |
| 2008/0005666 A1 | 1/2008 | Sefton et al. | |
| 2008/0093460 A1 * | 4/2008 | Frantz et al. | 235/462.46 |
| 2010/0330991 A1 * | 12/2010 | Sydir et al. | 455/436 |
| 2011/0044792 A1 * | 2/2011 | Talley et al. | 414/807 |
| 2011/0309140 A1 * | 12/2011 | Toothman et al. | 235/375 |
| 2012/0267427 A1 * | 10/2012 | Ahee et al. | 235/375 |

* cited by examiner

*Primary Examiner* — Tuyen K Vo
(74) *Attorney, Agent, or Firm* — Frost Brown Todd LLC

(57) ABSTRACT

An apparatus includes a memorial structure and a readable code. The memorial structure is associated with a deceased individual. The readable code is operable to provide information relating to the geographical location of the deceased individual.

14 Claims, 13 Drawing Sheets

SYSTEM AND METHOD FOR LOCATING AN UNMARKED BURIAL SITE

PRIORITY

This application claims priority to U.S. Provisional Patent Application Ser. No. 61/497,333, filed Jun. 15, 2011, entitled "SYSTEM FOR LOCATING AN UNMARKED BURIAL SITE," the disclosure of which is incorporated by reference herein.

BACKGROUND

When a friend or family member passes away, their loved ones may decide to inter the body of the deceased at a site within a cemetery. In some instances, the deceased may be placed within a plot of land signified by a physical headstone demarcating the deceased's burial location. For these cemeteries, if the cemetery is large, such as through expansion over time or by originally having a large plot of land, there may be a plethora of headstones and mausoleums populating the cemetery. In these cases, a simple map may be provided at the entrance indicating only broadly described areas within the cemetery. Thus, it may be up to those visiting the cemetery to wander about within that broad area to find the specific burial location they are looking for.

Even for small cemeteries, a multitude of paved paths and headstones may tend to populate the cemetery over the course of time after many deceased persons are buried there. While the headstones may make it readily identifiable where a person has been buried, a significant amount of clustering of headstones may result from the number of deceased interred at the cemetery. In areas with limited space, the cemetery may choose to maximize the number of plots possible while still providing a reasonable plot size. This maximization may result in some unpleasant clutter if each headstone is situated in close proximity to other headstones. Moreover, a significant amount of heat may be trapped within the cemetery as a result of the sun heating the concrete, marble, and other materials used for headstones and/or any asphalt that may pave a multitude of pathways. Further still, some communities may be sensitive to the sight of a cemetery, and having a large number of headstones may make the land readily identifiable as a cemetery, which might affect the value of land surrounding the cemetery.

Accordingly, while other systems and methods have been made and used to identify the locations of interred loved ones, it is believed that no one prior to the inventors has made or used an invention as described herein.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

Figure 1:
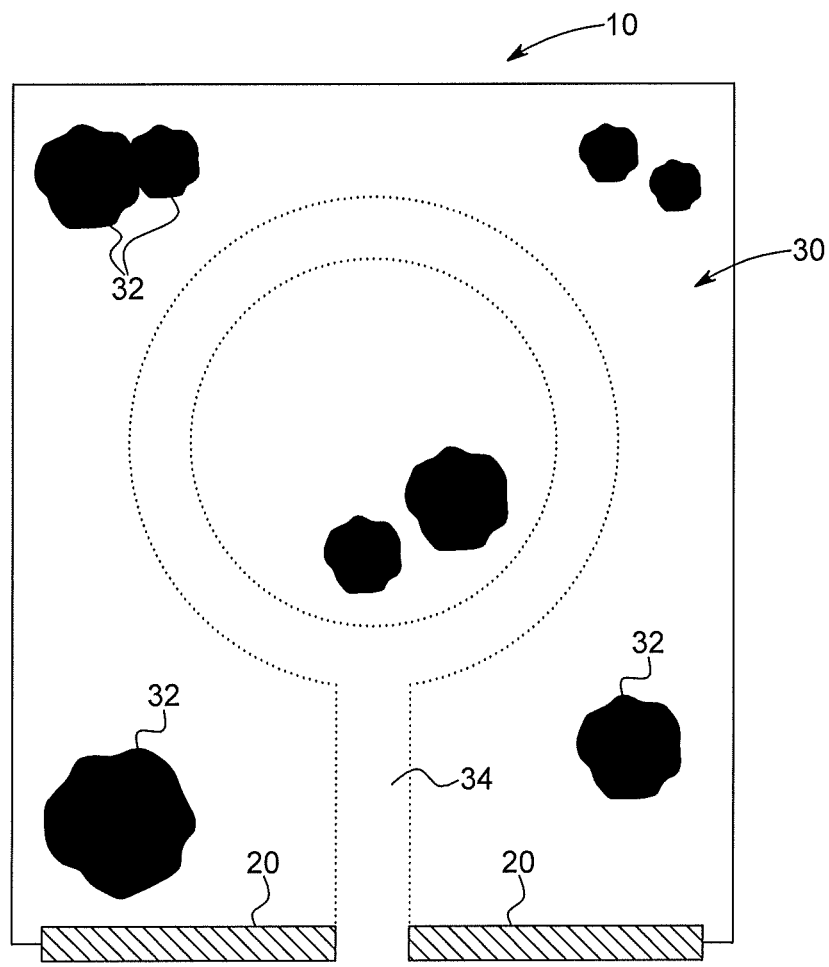
FIG. 1 depicts a diagrammatic view of an exemplary cemetery implementing a GPS location system.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

I. System and Method for Locating an Unmarked Burial Site

With the increasing concerns over global climate change, a variety of changes to how society operates have been presented across a wide variety of fields. One potential option may include the increasing use of "green" cemeteries—cemeteries that decrease their impact on the environment. One such configuration for these green cemeteries may include the elimination of the multitude of headstones that might otherwise populate the grounds of a cemetery. This may have a more natural appearance of the flora and fauna of the area. It may also decrease the amount of heat that is absorbed and retained by the cemetery, thereby decreasing the heating effects on the atmosphere at night. The configuration may further reduce the logistics of shipping the various components to the cemetery. Furthermore, asphalt that might otherwise be used to provide pathways for vehicles throughout a cemetery may be replaced by a gravel road, thereby further decreasing the impact of the cemetery on the environment. In this configuration, it may be useful to have a way of locating the burial site of a friend or loved one since there are no headstones.

A. Exemplary Cemetery

FIG. 1 depicts a diagram of one such exemplary "green" cemetery (10) with which a smartphone (50), shown in FIG. 5 as will be described later herein, having location determining abilities may be utilized for locating the burial place of a friend or loved one. Cemetery (10) comprises a memorial wall (20) near the entrance of the cemetery (10) and a burial area (30). In one merely exemplary alternative, memorial wall (20) may be housed within a building, such as a visitor's center. In the present example, burial area (30) is depicted as a substantially open field having a plurality of trees (32) and a dirt pathway (34) for access, though it should be understood that these components are merely optional. In this configuration, burial area (30) comprises a large expanse of grass that may have a more natural appearance than a cemetery populated by headstones. In addition, the present configuration may trap less heat than other cemeteries having a plethora of headstones and asphalt pathways. While the foregoing discusses an exemplary open, "green" cemetery, the present disclosure is not limited to use with green cemeteries. Indeed, one merely exemplary configuration may include a feature or memorial wall (20) to help locate notable grave sites in a cemetery. Such other configurations for cemetery (10) may include a conventional cemetery having a plurality of pathways and headstones or various combinations of features of a conventional cemetery and a substantially open cemetery, as will be apparent to one of ordinary skill in the art in view of the teachings herein. One such exemplary conventional cemetery with which a system using smartphone (50) having location determining abilities may be used is Arlington National Cemetery in Virginia where it may be difficult to precisely locate the burial location of a friend, loved one, or famous person.

It will also be appreciated that in some instances that the system and method which will be described in further detail below may be used across more than one cemetery (10) and need not necessarily be limited to a single cemetery. Other variations will be apparent to one of ordinary skill in the art in view of the teachings herein.

B. Exemplary Memorial Wall Having One or More Memorial Tiles

Figure 2:
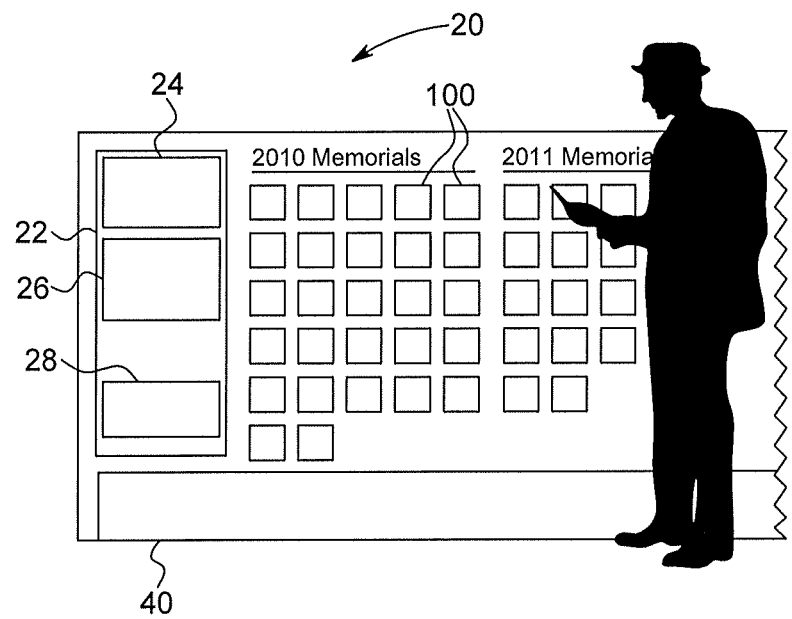
FIG. 2 depicts a diagrammatic view of a memorial wall for an exemplary cemetery implementing a GPS location system.

Referring to FIG. 2, an exemplary memorial wall (20) is shown comprising a plurality of memorial tiles (100) located thereon. Memorial wall (20) further comprises a first area (22) comprising an instruction section (24) on how to use the memorial tiles (100) with a user's Smartphone, a contact section (26) for contact information of the proprietor of the cemetery, a logo section (28), and/or any other suitable section that may be desired to be displayed with the plurality of memorial tiles (100). In the present example, memorial wall (20) is sized to be approximately five feet tall and has a no content zone (40) near the bottom of memorial wall (20), though this configuration is merely optional. Furthermore, the present exemplary memorial wall (20) comprises the plurality of memorial tiles (100) grouped by the year of the decedent's death, though this is also merely optional. In other exemplary configurations, memorial tiles (100) may be arranged alphabetically by last name, alphabetically by first name, numerically by date of birth, alphabetically by place of birth, and/or by any combination thereof or by any other suitable means as will be readily apparent to one of ordinary skill in the art in light of the teachings herein. While one exemplary configuration for memorial wall (20) has been described, still other suitable configurations will be apparent to one of ordinary skill in the art in view of the teachings herein. For instance, rather than a wall, any suitable structure may be used instead of memorial wall (20), including but not limited to a pillar, a console, a table, or any other suitable structure operable to hole one or more memorial tiles (100). Furthermore, while the exemplary version shows the use of a plurality of memorial tiles (100), it will be appreciated that other suitable configurations may be used including having a single memorial tile (100) with a changing display, special regions on memorial wall (20) rather than separable tiles, or any other suitable variation.

C. Exemplary Memorial Tile

Figure 3:
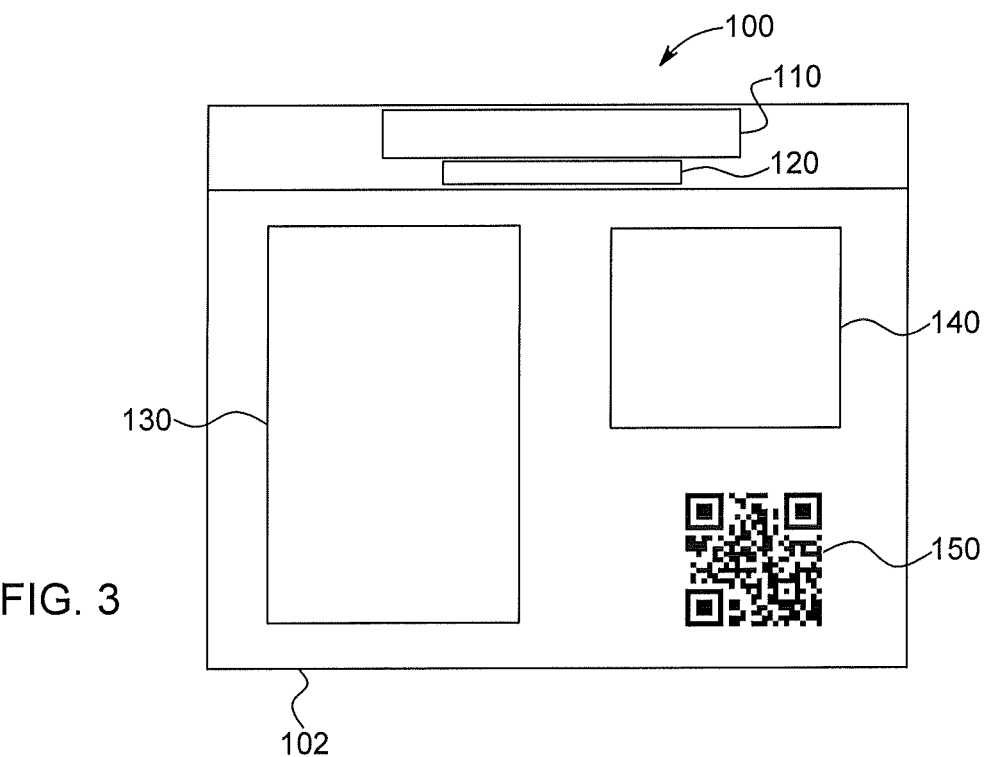
FIG. 3 depicts a diagrammatic view of an exemplary memorial tile having an identifier.

FIG. 3 depicts an exemplary memorial tile (100) that is displayed on memorial wall (20) for a deceased friend or loved one. In the present example, memorial tile (100) comprises a name section (110), a date of birth and/or date of death section (120), a first media section (130), a second media section (140), and an identifier (150). A background section (102) may also be included and comprises a selected background image. This background image may be preselected by a user during the design of memorial tile (100), the background image may be a default image, or the background image may be part of a theme selected for memorial tile (100). It should be further understood that the foregoing sections are merely optional and one of ordinary skill in the art will appreciate that various combinations of these sections and/or other sections not listed herein may be implemented in view of the teachings herein. Memorial tile (100) may alternatively be constructed in accordance with at least some of the teachings of U.S. Pat. No. 6,340,978, entitled "Method and Apparatus for Recording and Presenting Life Stories," issued Jan. 22, 2002, the disclosure of which is incorporated by reference herein; and/or U.S. Pat. No. 7,287,225, entitled "Method and Apparatus for Presenting Linked Life Stories," issued Oct. 23, 2007, the disclosure of which is incorporated by reference herein. Furthermore, the designing and creation of memorial tile (100) may be accomplished in accordance with at least some of the teachings of U.S. Pat. Pub. No. 2008/0005666, entitled "System and Method for Publishing Information and Content," published Jan. 3, 2008, the disclosure of which is incorporated by reference herein.

Name section (110) contains the name of the decedent in a form that may be preselected by a user during a design phase. The design phase may include selecting an accent font for the name to be displayed. One merely exemplary design phase is disclosed in U.S. Pat. No. 6,340,978, entitled "Method and Apparatus for Recording and Presenting Life Stories," issued Jan. 22, 2002. In the present example, name section (110) is located at the top of memorial tile (100), though it should be understood that name section (110) may be located at other positions on memorial tile (100), such as on one side or at the bottom of the tile. Date of birth and/or date of death section (120) of the present example is located below name section (110) though date of birth and/or date of death section (120) may likewise be located anywhere else on memorial tile (100). Date of birth and/or date of death section (120) may further include other dates, such as dates of marriage or dates of service in the military.

A first media section (130) is shown as a larger section occupying a portion of the left side of memorial tile (100). First media section (130) may contain a variety of different types of media, including, but not limited to, a photo, textual information, a video, a family tree, information about other relatives, and/or any other suitable media as will be apparent to one of ordinary skill in the art in view of the teachings herein. Moreover, first media section (130) may comprise an interactive screen or a dynamic display. The interactive screen may comprise a touch screen having a plurality of soft buttons and/or LCD screens having physical buttons to show information about the decedent, information about the decedent's family, notes left by previous loved ones or visitors, and/or a log of those who have recently visited the decedent. In the case of a dynamic display, an audio and/or visual presentation may be provided by a display, such as a LCD screen. The audio and/or visual presentation may continuously run on the memorial tile or the presentation may be activated by a physical button or remotely through the use of a user's Smartphone to send a wireless command. Some exemplary presentations may include those disclosed in U.S. Pat. No. 7,657,835, entitled "Method and System for Creating a Commemorative Presentation," issued Feb. 2, 2010, the disclosure of which is incorporated by reference herein; U.S. Pat. No. 7,624,344, entitled "Method and System for Creating a Video Presentation," issued Nov. 24, 2009, the disclosure of which is incorporated by reference herein; U.S. Pat. Pub. No. 2008/0282163, entitled "System and Method for a Multimedia Timeline," published Nov. 13, 2008, the disclosure of which is incorporated by reference herein.

Second media section (140) may also contain a variety of different types of media, including, but not limited to, a photo, textual information, a video, a family tree, information about other relatives, and/or any other suitable information as will be apparent to one of ordinary skill in the art in view of the teachings herein. Moreover, second media section (140) may also comprise an interactive screen or a dynamic display. Accordingly, second media section (140) may be configured in substantially the same way as first media section (130) or second media section (140) may have an alternative configuration as will be apparent to one of ordinary skill in the art in light of the teachings herein. For instance, the exemplary version uses a first media section (130) and a second media section (140), but other suitable versions may include more than two media sections or a single media section operable to display multiple panels of information.

Memorial tile (100) further comprises identifier (150). Identifier (150) of the present example is shown as a Quick Response (QR) code, though it should be understood that this is merely optional. Identifier (150) may be a standard bar code, a codablock, a micro QR code, a hexadecimal code, a binary code, a bokode, a color code, an HCCB, an RFID tag, a near field communication (NFC) device such as an NFC chip, and/or any other suitable machine-readable representation of data. It should also be understood that a user's smartphone (50) may include an application that is operable to perform optical character recognition (OCR) of text on memorial tile (100) (e.g., by reading the decedent's name on memorial tile (100), etc.), such that the text and/or other characters that can be read using an OCR process may serve as identifier (150).

In the present example, the QR code identifier (150) contains information to identify the decedent of the memorial tile (100) and a set of coordinates, such as GPS coordinates, geographic data, or any other suitable locating data, indicating the location of the burial site of the decedent. Of course, such information need not be included within the QR code identifier (150) itself. For instance, the QR code identifier (150) may be operable to simply direct a user's smartphone (50) to automatically access a website or other online resource that has the information. Identifier (150) may include other suitable information (and/or provide access to such other information), including a link to a memorial page on the internet, contact information for living relatives, references to other family members and their relations, and/or any other suitable information as will be apparent to one of ordinary skill in the art in view of the teachings herein. It should also be understood that one or more security features may provide restrictions on access to information about the decedent. For instance, the system may require entry of a password, submission of a biometric (e.g., fingerprint, voice recognition, etc.), and/or some other form of identification of the user of smartphone (50), and may provide greater or lesser access to information (or even no access to information) based on the identification of the user of smartphone (50). Alternatively, the system may simply provide full access to any user who scans identifier (150) with their smartphone (50).

The foregoing sections (102, 110, 120, 130, 140, 150) may further be collectively arranged as a theme that a user may select during the design phase of memorial tile (100). Alternative themes comprising various arrangements of sections (102, 110, 120, 130, 140, 150) and/or various preselected content (such as preselected images) for background section (102), first media section (130), second media section (140), and/or the accent font for name section (110) and date of birth and/or date of death section (120), may be provided for a user to choose from during the design phase of memorial tile (100).

D. Exemplary System and Method for Locating an Unmarked Burial Site

Figure 4:
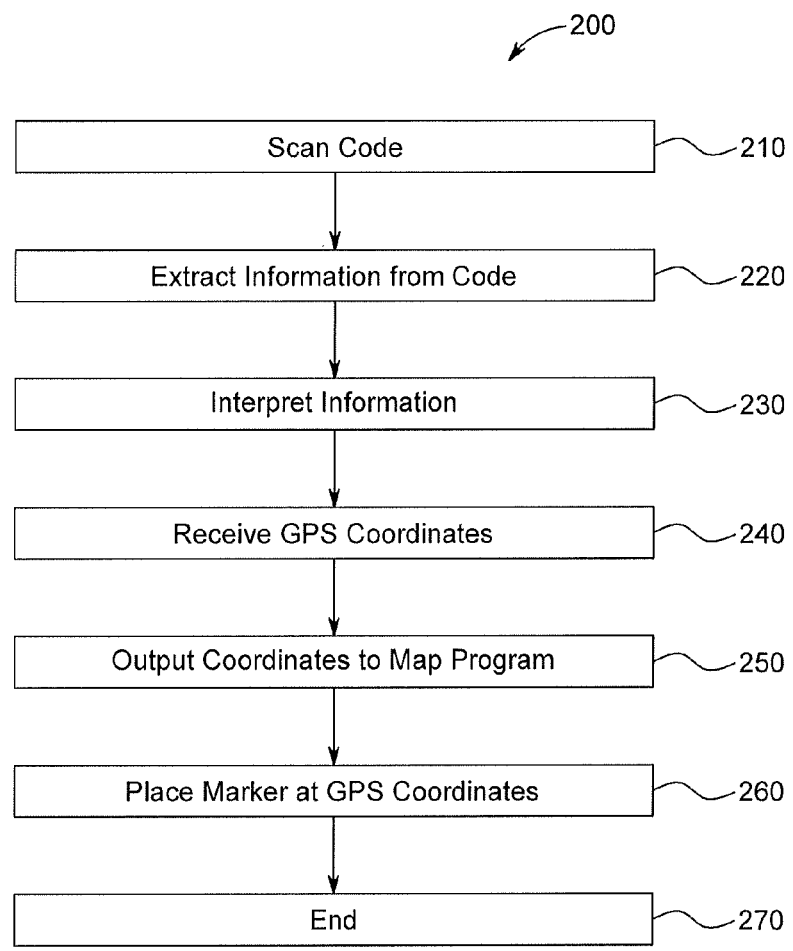
FIG. 4 depicts a flow chart of exemplary steps in a process for capturing, interpreting, and presenting information in connection with a memorial tile.

The flow chart of FIG. 4 illustrates an exemplary process (200) comprising a plurality of exemplary steps that may be carried out as part of the capturing of the identifier, processing the machine-readable information, and presenting the information. By way of example only, process (200) may be implemented by an application provided on smartphone (50) shown in FIG. 5, by instructions embedded in the machine-readable information of identifier (150), by a separate device provided by the cemetery, or by any other suitable method as will be apparent to one of ordinary skill in the art in view of the teachings herein. Process (200) begins at a first block (210) where the user captures the machine-readable information of identifier (150), shown in FIG. 3, by an appropriate method. In the present example, the user takes a photograph of the QR code with smartphone (50), as shown in FIG. 5. Alternatively, if an RFID tag is used, a user may receive the RFID signal with an appropriate feature of an appropriate device for use or for transfer to the user's smartphone (50), as shown in FIG. 5. With the photograph of the QR code stored within smartphone (50), as depicted in FIG. 5, an appropriate program or internal programming extracts the information contained within identifier (150) at block (220). Merely exemplary programs include zxing (known as "zebra crossing") provided by Google on the Android operating system or Barcode reader provided by Nokia on the Symbian operating system. The information from the QR code is then interpreted into identifiable segments at block (230). These segments may include the decedent's name, a numerical identifier for the decedent, a set of coordinates, such as GPS coordinates, geographic data, or any other suitable locating data, indicating the location of the burial site of the decedent, a set of coordinates, such as GPS coordinates, geographic data, or any other suitable locating data, indicating the location of the entrance to the cemetery, a web address for a memorial page, a link to a cemetery-hosted memorial page, and/or any other suitable information as will be apparent to one of ordinary skill in the art in view of the teachings herein. If a web address for a memorial page or a cemetery-hosted memorial page is provided by the QR code, those pages may include additional processes and/or links as will be described later herein.

If the QR code contains a set of coordinates, such as GPS coordinates, geographic data, or any other suitable locating data, for the burial location, process (200) continues to block (240) where the set coordinates are received from the data of the QR code after interpreting the QR code. These coordinates may then be directed to be output to an appropriate mapping program to identify the location, such as Google Maps or other suitable mapping programs and/or services, at block (250). The coordinates may further be identified on the map with a marker, such as an arrow, dot, or other suitable marker, according to block (260), though this step may be performed by the mapping service. Process (200) then ends at block (270). The user may then use the location on the map displayed on their smartphone (50) to find the correct burial location in the cemetery.

Figure 5:
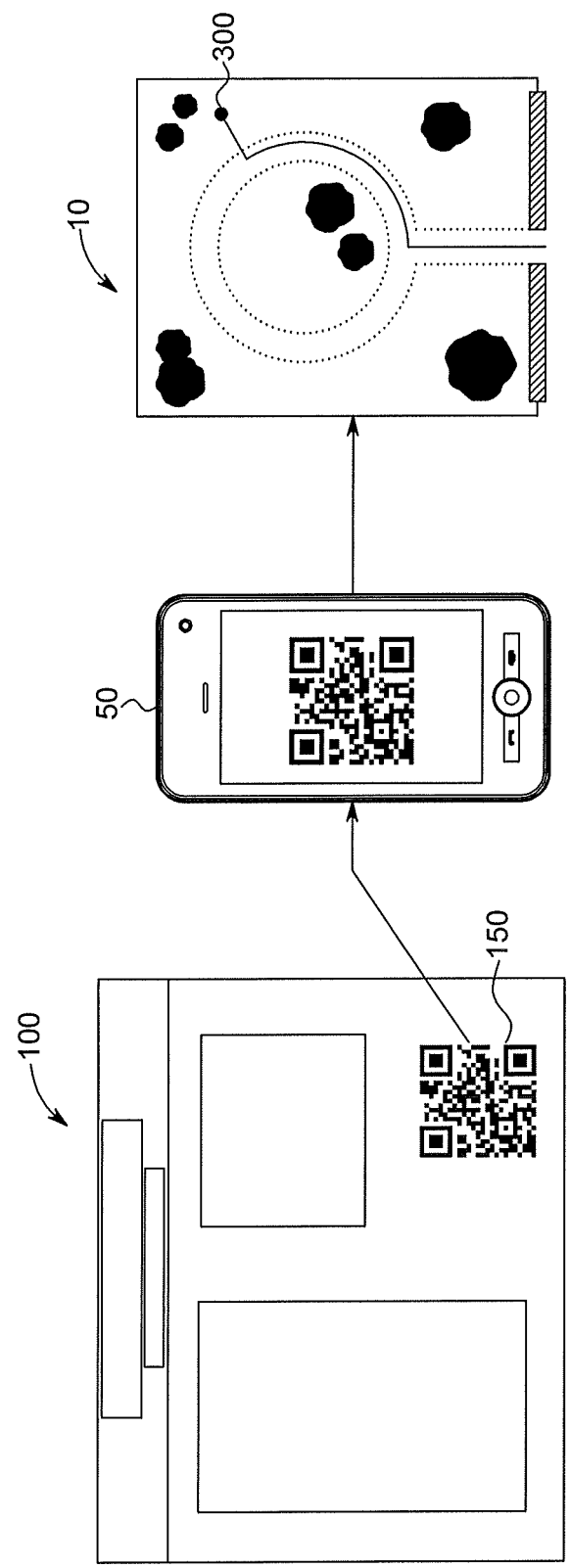
FIG. 5 depicts a diagrammatic view using an exemplary memorial tile and a Smartphone.

FIG. 5 depicts an exemplary diagrammatic sequence for using a smartphone (50) with a memorial tile (100), shown in FIG. 3, to locate the burial site of a friend or loved one within a cemetery (10), shown in FIG. 1, according to process (200) of FIG. 4 herein described. In this exemplary configuration, the user reads the identifier (150), shown as a QR code, into the smartphone (50). In the present example, the user takes a picture of the QR code with smartphone (50). A set of coordinates, such as GPS coordinates, geographic data, or any other suitable locating data, are extracted from the data of the QR code and sent to a mapping program on the user's smartphone (50), such as Google Maps. The location of the burial site according to the coordinates is then displayed as a point (300) on the map. The user may then walk, drive, and/or bicycle to the appropriate location to visit the burial site of the friend or loved one. When an indicator on the map for the user is aligned with point (300), the user is at the burial site of the friend or loved one. Alternatively, a directional route may be calculated for walking, driving, and/or biking from the user's location to point (300) or to return to a cemetery entrance. The directional route may be communicated to the user via audio and/or visual directions to guide a user to the burial location or to the cemetery entrance.

In one exemplary version, GPS coordinates may be provided to locate the burial site. In this configuration, the user may be guided to the burial site by comparing the GPS coordinates associated with the QR code to the GPS coordinates output by the user's smartphone (50) GPS system. In addition or in the alternative, the user's position relative to the burial site may be determined by triangulation of the user's Smartphone's (50) cell signal relative to the cell towers in the area. Since the locations of the cell towers may be fixed and known, the signal strength of the smartphone (50) relative to each of a plurality of towers may designate a radial distance from each cell tower. Locating the intersection of these radial distances may give an approximate location of the user's smartphone (50); thereby permitting the comparison of the location of the user's smartphone (50) relative to the burial site coordinates. In yet a further configuration, private signal towers may be erected around cemetery (10) and may be configured to communicate with smartphone (50) to triangulate the user's smartphone (50) relative to the private signal towers. Still yet other equally suitable locating methods for the user's smartphone (50) may be utilized as will be apparent to one of ordinary skill in the art in view of the teachings herein. It should also be understood that the user's location may be monitored and repeatedly updated in real time, allowing the location to be updated on the map on the user's smartphone (50), in relation to point (300) representing the burial site of interest.

Once the user is substantially near the burial site, as determined by one of the previously described locating methods, the user's smartphone (50) may emit an audio and/or visual signal indicating the user has arrived at the burial site. In some instances, the user's smartphone (50) may emit audio signals indicating that the user is approaching the burial site such that the user know that he or she is getting closer and closer to the burial site. The determination of whether the user is substantially near to the burial site may, for example, be made when the user is within 3 feet of the burial site as determined by one of the previously described locating methods. Merely exemplary audio and/or visual signals may include an indicator light flashing, a beep, a pre-recorded message, or any other suitable signifier as will be apparent to one of ordinary skill in the art in light of the teachings herein. In addition or in the alternative, the user may determine that they have reached the burial site (or at least the vicinity of the burial site) by viewing the repeatedly updated representation of the user's position on the map displayed by the user's smartphone (50) in relation to the representation of point (300) on the same map displayed by the user's smartphone (50). Each cemetery may also include detailed maps that may be provided independently by the cemetery, or through a third-party (such as by a mobile phone application or uploaded to Google Maps), that may further refine the mapping feature for finding the burial site.

In yet a further configuration, a physical marker may be located at the burial site to indicate the location of the grave. Such a physical marker may include items that are not headstones and may be substantially smaller than a headstone, such as a stake, stone, medallion, plaque, tree, bush, or any other suitable marker or mini-marker as will be apparent to those of ordinary skill in the art in view of the teachings herein. Further still, landmarks may also be utilized to assist the user in identifying the appropriate location. For instance, the QR code may include commentary, such as "10 feet East of the boulder by the lake," to aid the user in locating the burial site. In yet a further alternative, an RFID tag may be located near the burial site, such as buried in the ground, to alert the smartphone (50) to the location of the burial site. In one merely exemplary configuration, the QR code may include information to identify the appropriate RFID tag such that only the selected RFID tag, of a plurality of RFID tags located in the cemetery (10), alerts the smartphone (50) to the burial location.

While the preceding discussion related to locating a deceased friend or loved one in a cemetery, it should be understood that the concepts described herein may be readily applied in a variety of other contexts. Such other contexts and various ways may include locating a car in a rental lot, locating an item in a warehouse, finding a store in a mall, getting directions to a ride at an amusement park, locating a seat at a stadium, or any other suitable implementation as will be apparent to those of ordinary skill in the art in view of the teachings herein. In these settings, identifier (150) may be configured to comprise a set of coordinates for an item (such as a car, a box, a store, a ride, or a seat) such that when identifier (150) is scanned by smartphone (50), the user may locate the item in accordance with at least some of the teachings herein described. Furthermore, other implementations of the foregoing disclosure may be utilized in conjunction with private and/or public landmarks, restaurants, churches, parks, golf courses, schools, monuments, or other organizations and places as will be apparent to those of ordinary skill in the art in view of the teachings herein.

II. Exemplary Mobile Memorial Page or Mobile Application

Figure 6A:
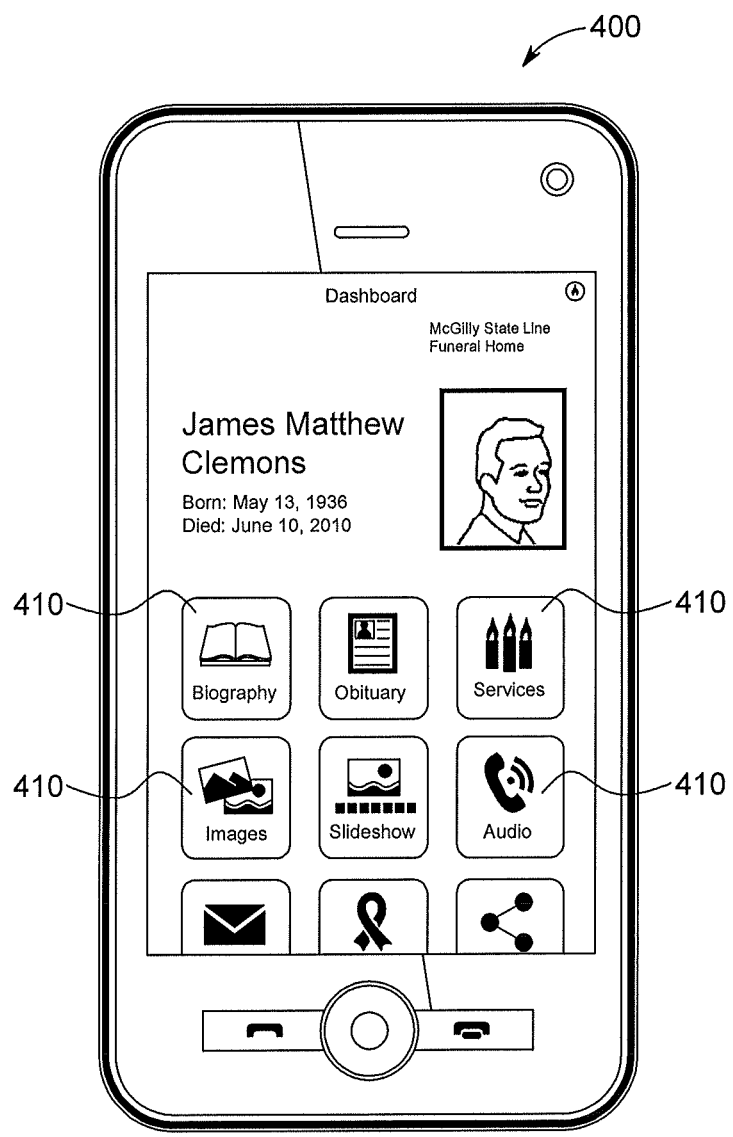
FIG. 6A depicts an exemplary view of a main webpage for use with a Smartphone.
Figure 6B:
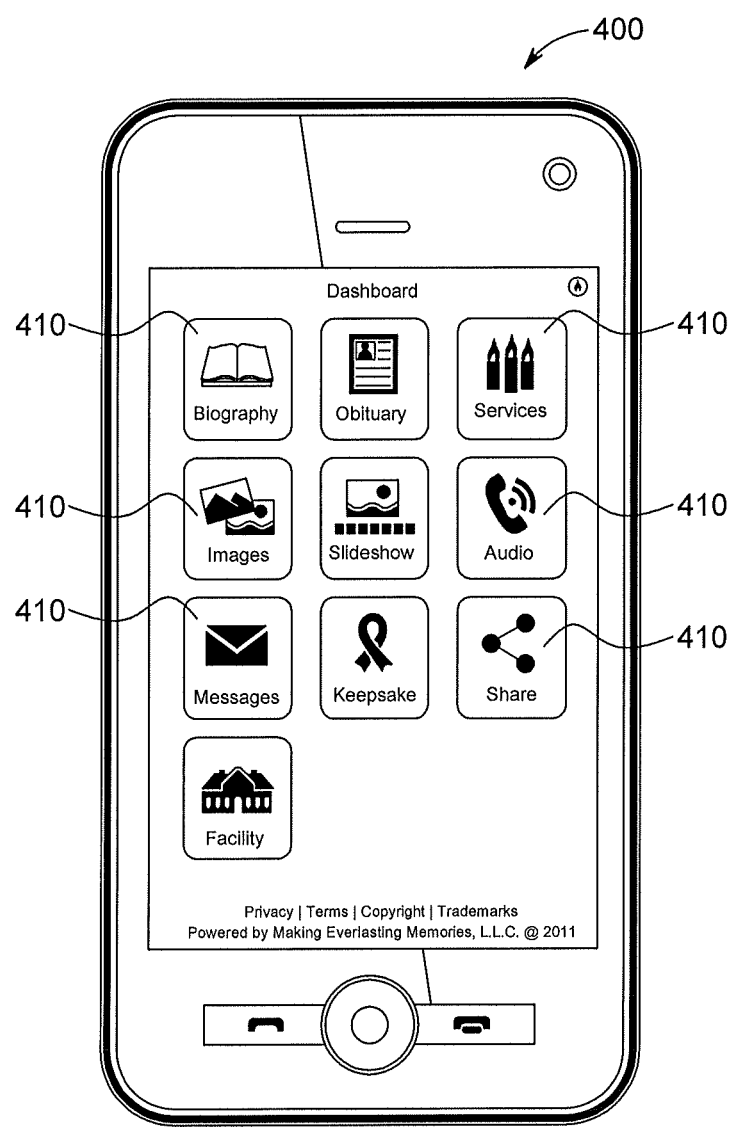
FIG. 6B depicts a second portion of the view of the main webpage of FIG. 6A.

In some versions, the QR code may include a web address for a memorial page (400), as shown in FIGS. 6A-6B. If memorial webpage (400) is included, memorial page (400) may be a mobile device friendly page that may comprise a plurality of options (410) from which the user may select. Such selection options may include coordinates for the burial location, a link to a full memorial page, a link to an audio and/or visual presentation page, a set of coordinates for the entrance of the cemetery when leaving, a link to a biography page, a link to an obituary page, a link to a services page, a link to a messages page and/or any other features that will be apparent to one of ordinary skill in the art in light of the teachings herein. Examples of other full memorial pages may be provided in accordance with at least some of the teachings of U.S. Pat. No. 7,222,120, entitled "Methods of Providing a Registry Service and a Registry Service," issued May 22, 2007, the disclosure of which is incorporated by reference herein; and/or U.S. Pat. Pub. No. 2007/0260610, entitled "Methods of Providing a Registry Service and a Registry Service," the disclosure of which is incorporated by reference herein. If the user selects the option to view the full memorial page, the user's smartphone (50) may be directed to the appropriate internet web address for the full memorial web page. Exemplary audio and/or visual presentations may include those disclosed in U.S. Pat. No. 7,657,835, entitled "Method and System for Creating a Commemorative Presentation," issued Feb. 2, 2010; U.S. Pat. No. 7,624,344, entitled "Method and System for Creating a Video Presentation," issued Nov. 24, 2009; U.S. Pat. Pub. No. 2008/0282163, entitled "System and Method for a Multimedia Timeline," published Nov. 13, 2008, the disclosures of which are incorporated by reference herein.

Figure 7:
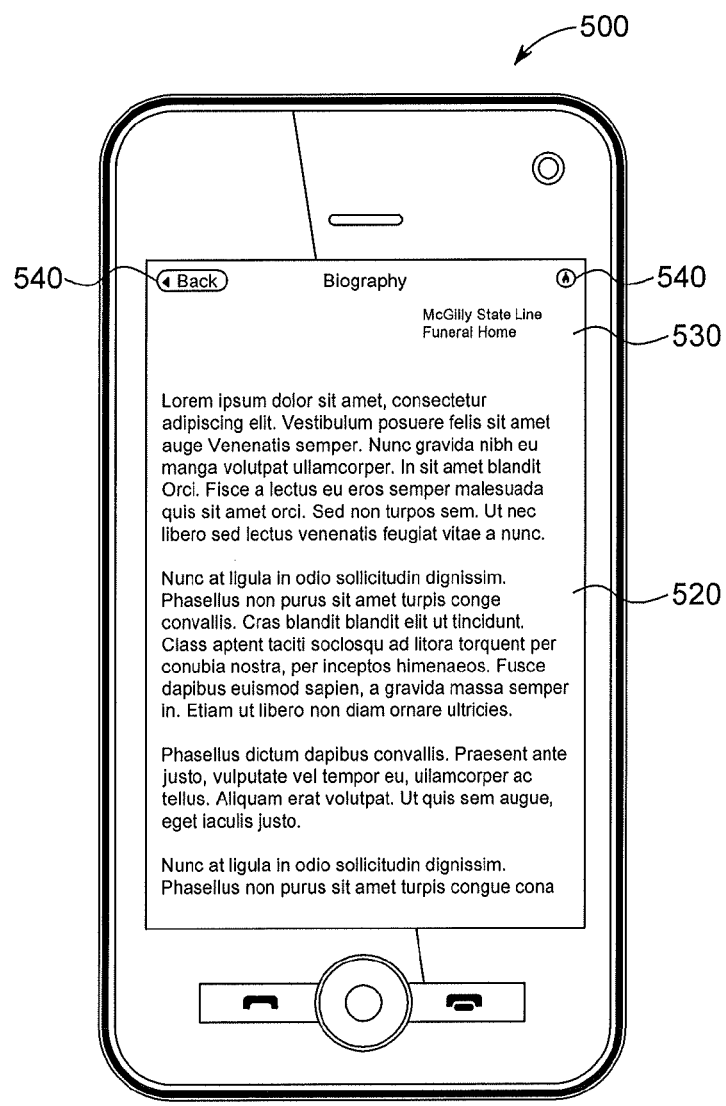
FIG. 7 depicts an exemplary view of a textual page.

Referring to FIG. 7, an exemplary textual page (500) may comprise a header section (510), a text section (520), and an attribution section (530). Optionally, directional buttons (540) may be included for a user to return to a previous page and/or return to memorial webpage (400). Header section (510) of the present example includes a short textual heading indicating the type of page presented to the user. Merely exemplary headings (510) may include "Biography," "Obituary," "Services," "Facility Information," or any other suitable heading. Text section (520) comprises text that relates to the deceased individual, to the funeral services, to the funeral home or cemetery, or any other suitable textual information as will be apparent to one of ordinary skill in the art in view of the teachings herein. Attribution section (530) may comprise information about the provider of the memorial webpage and/or the funeral home or cemetery.

Figure 8:
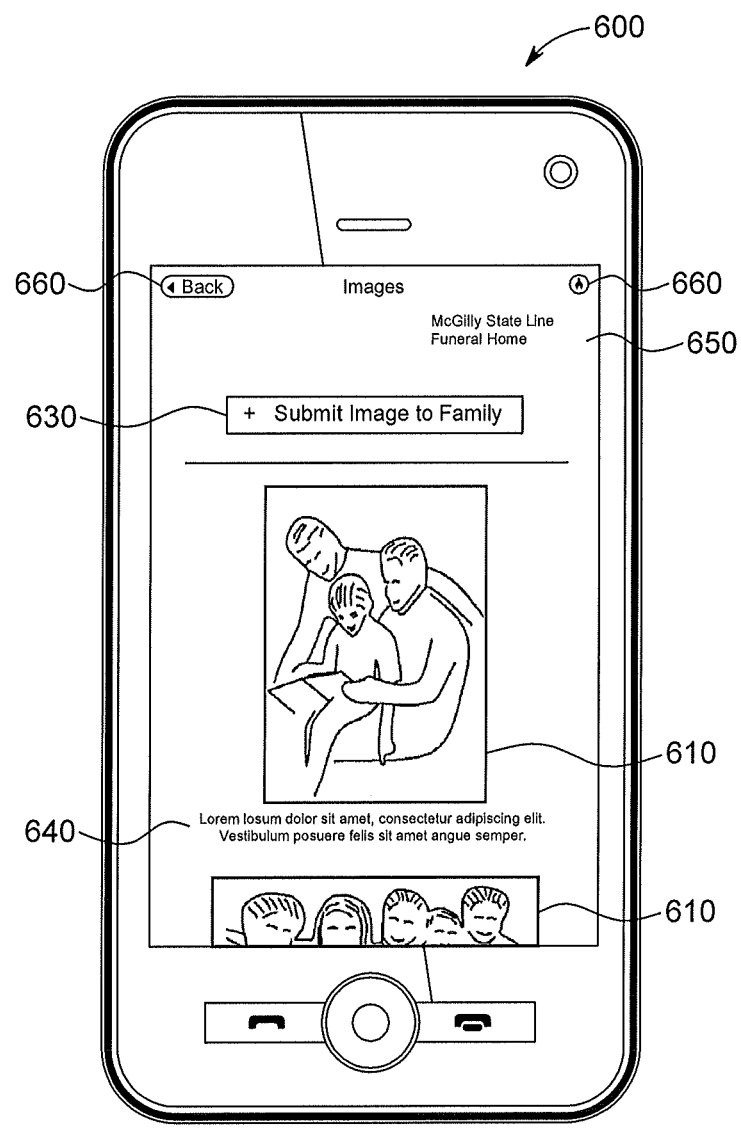
FIG. 8 depicts an exemplary multimedia page showing the display of a plurality of images.

FIG. 8 depicts a multimedia page (600) showing the display of a plurality of multimedia items (610). Multimedia page (600) may also comprise a header section (620), a submission link (630), captions (640), an attribution section (650), and directional buttons (660), though it should be understood that any of the foregoing is merely optional. As with the textual page (500), header section (620) of the present page comprises a short textual heading indicating the type of page presented to the user. Merely exemplary headings (620) may include "Photos," "Videos," "Slideshow," "Presentation," "Keepsake," or any other suitable heading. Attribution section (650) and direction buttons (660) may be substantially similar to attribution section (530) and directional buttons (540) discussed previously. Multimedia items (610) may comprise still digital images, such as photographs or computer generated graphics, a plurality of images and/or a plurality of text sections to form a slideshow or presentation, a video, or any other suitable multimedia items. Captions (640) may be provided to describe the current image, slideshow slide, presentation page, or video. Further still, in the case of a slideshow, presentation, or video, control buttons may be included, such as play, rewind, fast forward, step forward, step back, pause, stop, or any other suitable control button. A submission link (630) may also be provided for users of multimedia page (600) to submit multimedia items (610) to be incorporated into multimedia page (600) through a submission page (900), as will be explained in further detail below.

Figure 9:
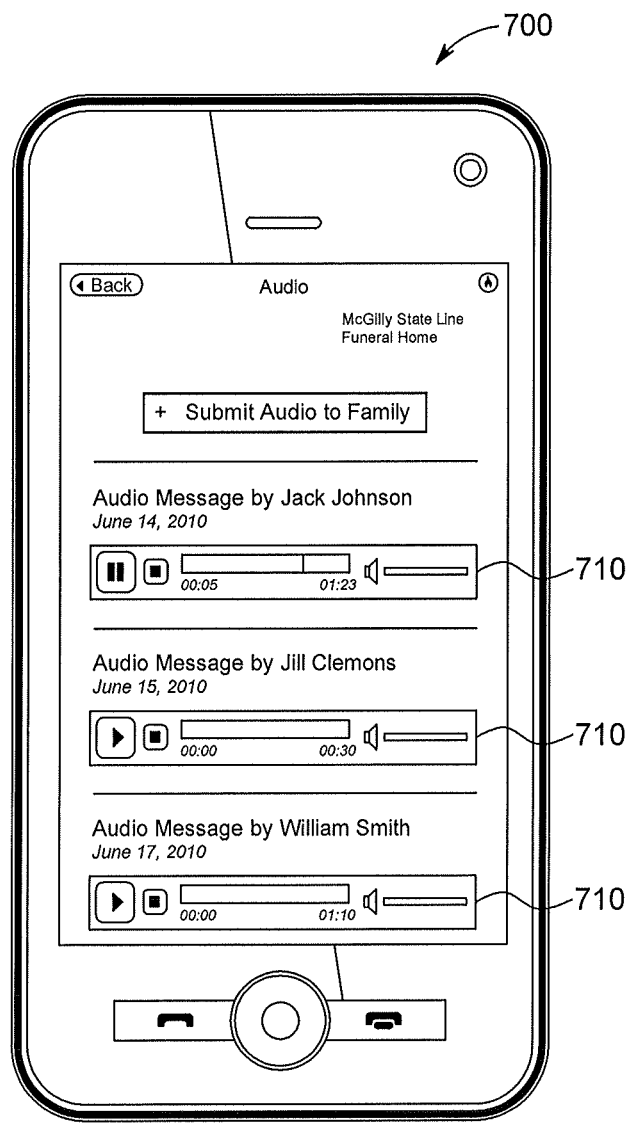
FIG. 9 depicts an alternative multimedia page comprising a plurality of audio files.

FIG. 9 depicts an alternative multimedia page (700) that may be configured in a substantially similar manner to multimedia page (600); however, alternative multimedia page (700) comprises a plurality of audio recordings (710). Audio recordings (710) may comprise messages left by loved ones, messages from the deceased person, music, soothing background sounds, or any other suitable audio as will be apparent to one of ordinary skill in the art in view of the teachings herein.

Figure 10:
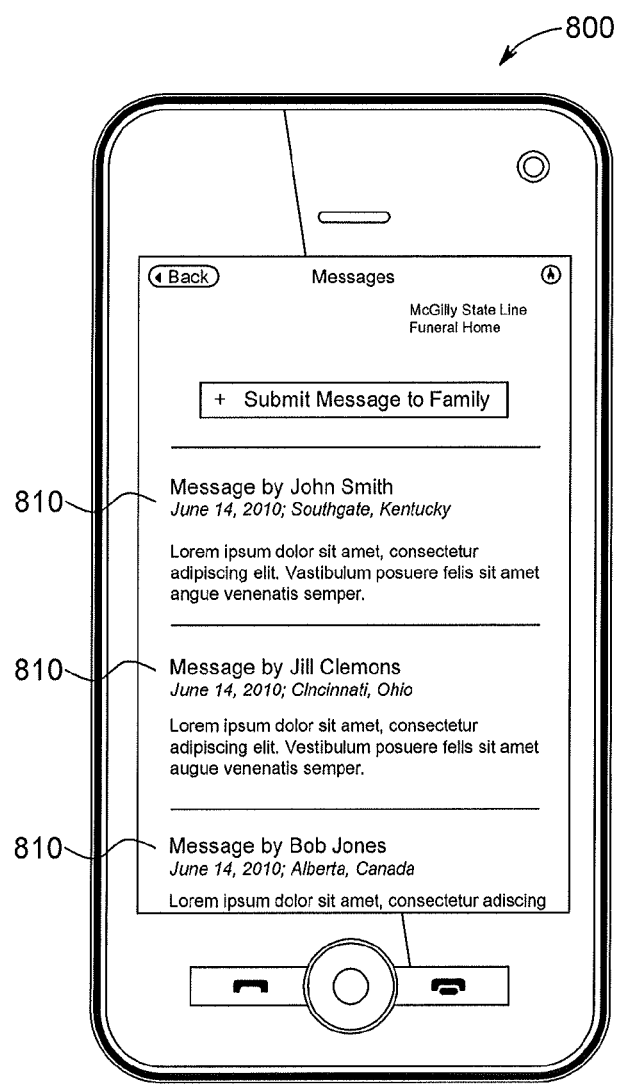
FIG. 10 depicts yet another multimedia page comprising a plurality of messages.

Yet another alternative multimedia page (800), shown in FIG. 10, comprises a plurality of messages (810). As with multimedia page (700), multimedia page (800) of the present example may be configured in a substantially similar manner to multimedia page (600). The plurality of messages (810) may comprise an electronic bulletin-board style message system where messages (810) are displayed in a sequential manner on the same page, or messages (810) may be individually linked to multimedia page (800), such that each message is displayed individually. Still other configurations for alternative multimedia page (800) will be apparent to one of ordinary skill in view of the teachings herein.

Figure 11:
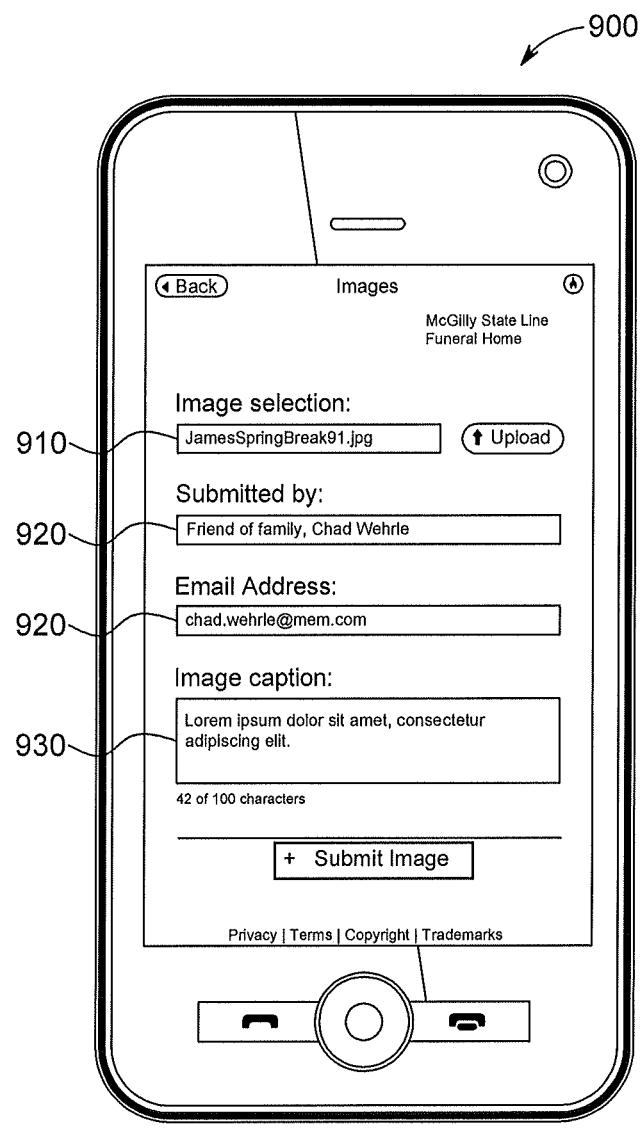
FIG. 11 depicts an exemplary submission page.

As referred to above, a submission page (900), shown in FIG. 11, is configured to permit users to submit information, images, messages, videos, audio, or any other suitable media. Submission page (900) of the present example comprises a media selection portion (910), a submitter section (920), and a caption section (930), though it should be understood that these are merely optional. Media selection portion (910) is configured to permit a user to select an image, video, presentation, slideshow, or any other suitable media to be uploaded to memorial website (400). The user may be prompted to select media located locally on the user's phone, from a source accessible on the Internet, or from a remote device over a network. Submitter section (920) is configured to allow the user to include information identifying the user, such as a name, email address, phone number, or any other suitable information. Caption section (930) is configured to permit a user to optionally include a text caption to identify the subject matter of the submitted media item. Such captions may be entered by the user or, in the alternative, one or more predetermined captions may be provided for the user to select from. In the case of predetermined captions, a database of captions may be stored locally (such as on a user's mobile device) or on a remote server accessed via a network, such as a web server that also hosts memorial page (400). Still other equally suitable sections and configurations for submission page (900) will be apparent to one of ordinary skill in the art in view of the teachings herein. For example, a message system may be configured to receive text messages, e-mail message, or by any other suitable submission method. The message system may receive these messages, reformat them (if necessary), and submit the text, photo, video, presentation, audio, or other media for display on the appropriate page. Further still, the submission and presentation of media items may be accomplished in accordance with at least some of the teachings of U.S. Pat. Pub. No. 2008/0005666, entitled "System and Method for Publishing Information and Content," published Jan. 3, 2008, there disclosure of which is incorporated by reference herein.

In yet a further configuration, memorial page (400) and the additional pages (500, 600, 700, 800, 900) may be configured for use in a mobile application, such as an iPhone application or an Android application. The mobile application may either be a stand-alone application or an application that retrieves data from the Internet or from a networked server. For instance, a web server may host one or more objects to be sent to the mobile application, and the end user device, such as a mobile phone, may access the one or more objects for use with the mobile application. Moreover, for the display of a web page, a similar configuration may also be applicable. The content of the web page may be hosted on one or more web servers and the end user device, such as a mobile phone, may access the content over a wireless network to display the content on the user's end user device. One merely exemplary configuration may include a server coupled to a local wireless network located at or near the cemetery that permits only users near to the cemetery to access the information. Still further configurations for a mobile application will be apparent to one of ordinary skill in the art in view of the teachings herein.

Figure 12:
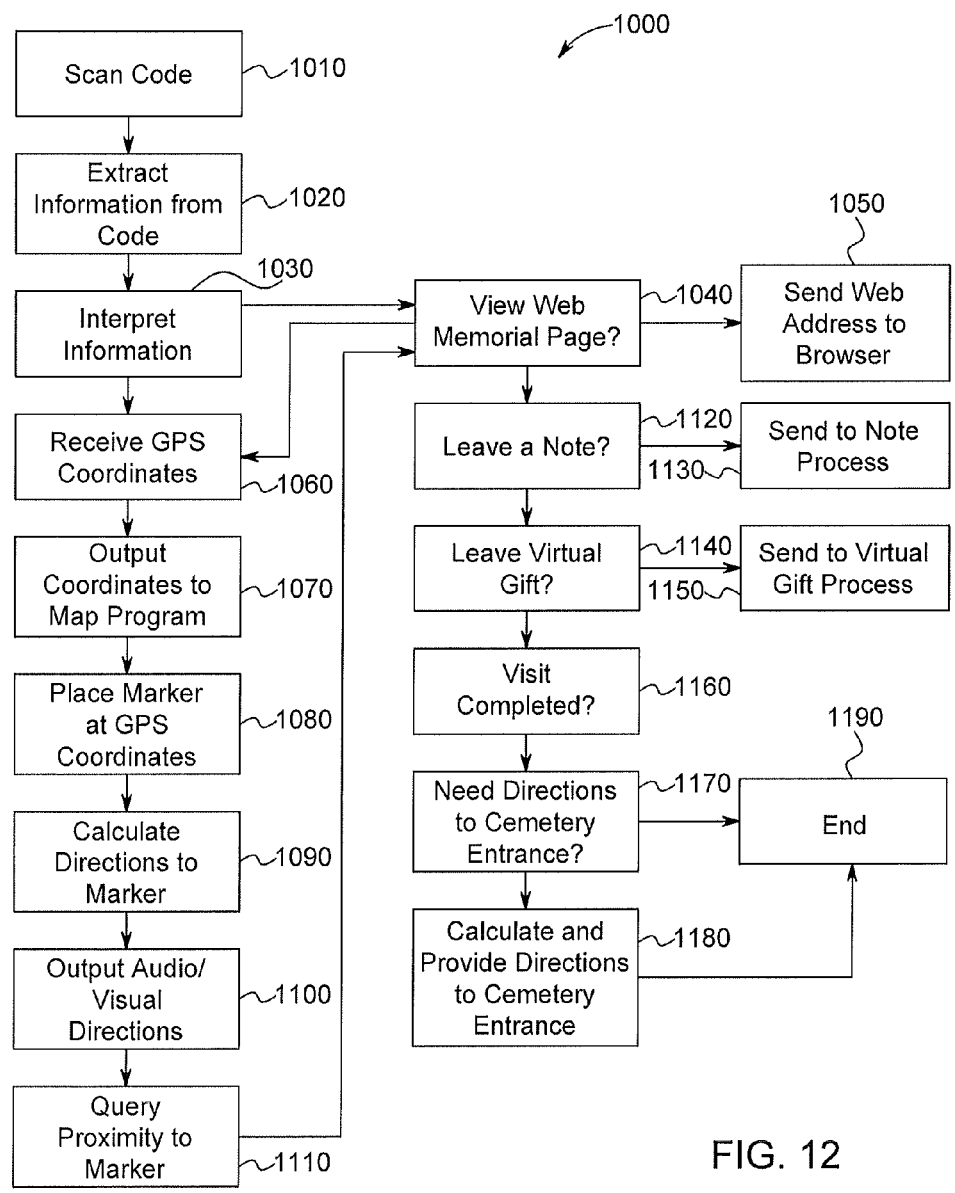
FIG. 12 depicts a flow chart of exemplary steps in a process for capturing, interpreting, directing a user to a mobile webpage, and presenting information in connection with a memorial tile.
Figure 13:
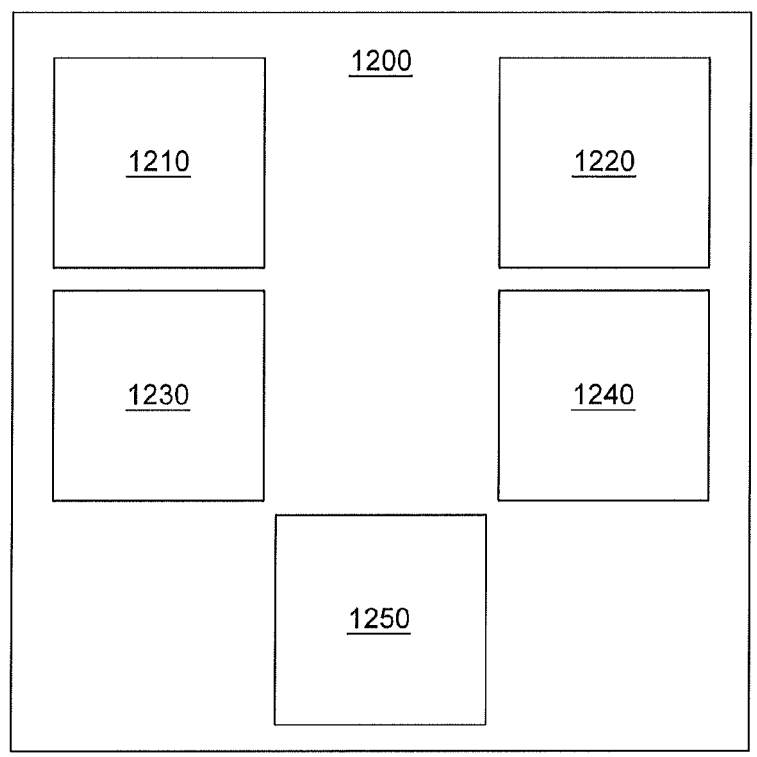
FIG. 13 depicts a schematic of an exemplary mobile application for notifying a user of nearby locations.

III. Exemplary System and Method for Locating an Unmarked Burial Site and Displaying a Mobile Memorial Page or Mobile Application Memorial page (400) and/or a mobile application may be used in conjunction with memorial tile (100) to create a system for locating a burial site and accessing information about the deceased individual. The flow chart of FIG. 12 illustrates an exemplary process (1000) comprising a plurality of exemplary steps that may be carried out as part of the capturing of identifier (150), processing the machine-readable information, and presenting the information. By way of example only, process (1000) may be implemented by an application for smartphone (50), by a separate device provided by the cemetery (for example, a specially configured device configured for process (1000) or a server performing process (1000) that communicates the result back to smartphone (50)), or by any other suitable method as will be apparent to one of ordinary skill in the art in view of the teachings herein.

Process (1000) begins at a first block (1010) where the user captures the machine-readable information of identifier (150), shown in FIG. 3, by an appropriate method. In the present example, the user takes a photograph of the QR code with smartphone (50), as shown in FIG. 5. Alternatively, if an RFID tag is used, a user may receive the RFID signal with an appropriate feature of an appropriate device for use or for transfer to the user's smartphone (50). With the photograph of the QR code stored within smartphone (50) an appropriate program, internal programming, or firmware extracts the information contained within identifier (150) at block (1020). Merely exemplary programs include zxing (known as "zebra crossing") provided by Google on the Android operating system or Barcode reader provided by Nokia on the Symbian operating system. The information from the QR code is then interpreted into identifiable segments at block (1030). These segments may include the decedent's name, a numerical identifier for the decedent, a set of coordinates, such as GPS coordinates, geographic data, or any other suitable locating data, indicating the location of the burial site of the decedent, a set of coordinates, such as GPS coordinates, geographic data, or any other suitable locating data, indicating the location of the entrance to the cemetery, a web address for a memorial page, a link to a cemetery-hosted memorial page, and/or any other suitable information as will be apparent to one of ordinary skill in the art in view of the teachings herein.

If a web address for a memorial page or an address to a cemetery-hosted memorial page is provided in the data of indicator (150), smartphone (50) may be instructed to automatically display the memorial page, such as memorial page (400). Alternatively, in a configuration including a mobile application, the mobile application may be activated upon the scanning of indicator (150) and the application may query whether the user would like to view the memorial page at block (1040). If the user decides to view the memorial page, process (1000) directs smartphone (50) to display the memorial page on a mobile web browser on Smartphone at block (1050).

If the QR code contains a set of coordinates, such as GPS coordinates, geographic data, or any other suitable locating data, for the burial location, process (1000) continues to block (1060) where the set coordinates are received from the data of the QR code after interpreting the QR code. These coordinates may then be directed to be output to an appropriate mapping program to identify the location, such as Google Maps or other suitable mapping programs and/or services, at block (1070). In one alternative, for a mobile application tailored to a specific cemetery, such as Arlington National Cemetery, the application may have a mapping feature included with which the coordinates may be used. The coordinates may further be identified on the map with a marker, such as point (300) of FIG. 5, an arrow, dot, or other suitable marker, at block (1080). At block (1090), directions may be calculated to indicate the path a user may take to arrive at the marker from their present location. Such directions may include driving, walking, or biking directions. Optionally, at block (1100), audio and/or visual directions may be provided to the user to assist the user to travel to the marker.

In one exemplary version, GPS coordinates may be provided to locate the burial site. In this configuration, the user may be guided to the burial site by comparing the GPS coordinates from the QR code to the GPS coordinates output by the user's smartphone (50) GPS system. In addition, or in the alternative, the user's position relative to the burial site may be determined by triangulation of the user's Smartphone's (50) cell signal relative to the cell towers in the area. Since the locations of the cell towers may be fixed and known, the signal strength of the smartphone (50) relative to each of a plurality of towers may designate a radial distance from each cell tower. Locating the intersection of these radial distances may give an approximate location of the user's smartphone (50); thereby permitting the comparison of the location of the user's smartphone (50) relative to the burial site coordinates. In yet a further configuration, private signal towers may be erected around cemetery (10), shown in FIG. 1, that may be configured to communicate with smartphone (50) to triangulate the user's smartphone (50) relative to the private signal towers. Still yet other equally suitable locating methods for the user's smartphone (50) may be utilized as will be apparent to one of ordinary skill in the art in view of the teachings herein. It should also be understood that the user's location may be monitored and repeatedly updated in real time, allowing the location to be updated on the map on the user's smartphone (50), in relation to point (300) representing the burial site of interest.

Process (1000) may further contain a step that queries the proximity of the user's location relative to the coordinates of point (300) shown as block (1110). As mentioned above, an audio and/or visual signal may be emitted by smartphone (50) when the user is near or substantially near to point (300). Process (1000) may then repeat the query at block (1040) to query whether the user would like to view the memorial page after the user is near the burial site. If so, smartphone (50) may be directed to open the memorial page on the Smartphone's web browser at block (1050).

One merely exemplary optional feature may be to query whether the user would like to leave a note, shown at block (1120). If the user decides to do so, smartphone (50) may be directed to a submission page on a memorial page, such as submission page (900), or the submission may be performed by a separate process contained within a mobile application, shown by block (1130). While the previous example relates to notes, the process may be equally suitable for submitting images, videos, presentations, voice recordings, slideshows, or any other suitable item as will be readily apparent to one of ordinary skill in the art in view of the teachings herein. Yet another optional feature may include a query of whether the user would like to leave a virtual gift as shown in block (1140). If so, then process (1000) directs smartphone (50) to an appropriate virtual gift submission page on a memorial page or to a virtual gift process on a mobile application at block (1150). Such virtual gifts may comprise images, such as images of flowers, angels, or any other appropriate image, though such gifts need not be limited to images. These images may further be displayed on a memorial page, such as memorial page (400) for other visitors to view. Moreover, such gifts may not be limited to virtual gifts either. Indeed, in one merely exemplary configuration, process (1000) may alternatively direct a user to a web page or mobile application where the user may purchase physical items to be placed at the burial site, either for use during a funeral service or afterwards, or to be sent to the living relatives of the deceased individual.

Process (1000) may further query whether the user's visit is completed at block (1160). If the user's visit is not completed, process (1000) may be configured to return to any of the prior steps in process (1000), or process (1000) may be configured to perform a number of alternative features, such as inquiring about or directing a user to a different burial site. If the user's visit is completed, process (1000) may optionally proceed to block (1170) to query whether the user would like directions back to the cemetery entrance. These coordinates may be provided in identifier (150), on a memorial page, or by a mobile application. If the user requests directions, process (1000) calculates and provides directions back to the cemetery entrance at block (1180) in a substantially similar manner to blocks (1060) through (1100). Process (1000) ends at block (1180).

IV. Exemplary Landmark Reminder Application

In some situations a user may pass near a landmark, memorial, or other point of interest without knowledge that the landmark, memorial, or other point of interest is nearby. In such situations, the user may desire to visit such landmarks, memorials, or other points of interest—based upon an interest in similar landmarks, memorials, or other points of interest—but the lack of notice about the landmark, memorial, or other point of interest may result in the user passing by without stopping. Accordingly, it may be useful to users to have an alert about those landmarks, memorials, or other significant points of interest when the user is nearby.

A mobile application (1200) may comprise a database query process (1210), a location query process (1220), a notification process (1230), a configuration process (1240), and a user interface (1250). The location query process (1220) receives location information from smartphone (50), and outputs the location information to database query process (1210). The location information may comprise GPS coordinates, zip code location, city location, state location, country location, street intersection, cell tower triangulation information, or any other suitable location identifying information for the Smartphone as will be apparent to one of ordinary skill in the art in view of the teachings herein.

Database query process (1210) is configured to send and receive data to and from a database comprising location information for landmarks, memorials, or other points of interest. The database may be hosted on a server that may be accessed through the Internet or over a wireless network (such as a mobile phone network or a wifi network), or the database may be hosted on the Smartphone on a local storage device (such as a hard disk, flash drive, CD-ROM, DVD, or any other suitable non-transitory computer readable medium). The database may have a plurality of entries comprising location information (such as GPS coordinates, zip code locations, city locations, state locations, country locations, street intersections, cell tower triangulation information, or any other suitable location identifying information of the landmarks, memorials, or other points of interest), identifying information (such as the name of the entry, the address, whether the entry is user-defined, or any other identifying information), interesting facts about the entry, and/or any other suitable information as will be apparent to one of ordinary skill in the art in view of the teachings herein. In addition, the entries about the landmarks, memorials, or other points of interest may be preset (such as by a mobile application creator, a manufacturer of the device, a company, an organization, or any other entity), the entries may be user-defined, or the entries may comprise both preset data and user-defined data. Furthermore, the server and/or mobile application hosting the database may be configured to synchronize the database with other external databases, such as a Family Heritage Registry® database, Everlasting Memorial® database, Landmark Memorial database, Find-a-Grave.com, or any other suitable database of information.

Merely exemplary landmarks, memorials, or other points of interest may include burial sites for deceased loved ones, burial locations for famous or important individuals (such as former presidents, senators, governors, actors, actresses, scientists, authors, musicians, etc.), residential locations for family or friends, residential locations for famous or important individuals, famous locations (such as the White House, the Eiffel Tower, the Llouvre, Buckingham Palace, the Taj Mahal, etc.), categorized sites (such as parks, golf courses, beaches, monuments, public pieces of art, historical locations, business locations, etc.), restaurants or other places for food or drinks, bars, ethnically relevant locations, schools, churches, tourist attractions, gas stations, free wifi locations, roadside memorials, or any other suitable landmarks, memorials, or other points of interest as will be apparent to one of ordinary skill in the art in view of the teachings herein.

Database query process (1210) is configured to retrieve one or more relevant entries based upon location information received from location query process (1220). The determination of which entries to retrieve may be user-defined, such as through a selection interface, as described below in reference to configuration process (1240), or the determination may be based upon a preset value. By way of example only, if a user desires to know about landmarks, memorials, or other points of interest that are within one mile of the Smartphone's location, database query process (1210) may be preset with this value or the user may define this value through a selection interface. Accordingly, when database query process (1210) receives the location information from location query process (1220), database query process (1210) retrieves entries that are located within one mile of the Smartphone's current location. The received entries may then be sent to notification process (1230), as will be described in more detail herein.

As noted previously, configuration process (1240) may comprise a plurality of selection interfaces through which a user may define a variety of variables for determining which entries are retrieved by database query process (1210). Configuration process (1240) may comprise a distance variable, an interest variable, a type of place variable, and any other suitable configuration variable as will be apparent to one of ordinary skill in the art in view of the teachings herein. The distance variable may comprise preset selections of one mile, five miles, twenty five miles, half a mile, a custom selection, preset metric selections, and/or any other suitable distance variable. Interest variables may include burial sites of family members, burial sites of friends, burial sites of famous persons, historical locations (for example old west locations, Chicago mobster locations, civil war locations, etc.), or any other suitable interest variables. Types of place variables may include gas stations, parks, museums, company stores, bars, restaurants, or any other suitable type of place variable. By way of example only, the user may select a distance variable of one mile and an interest variable to be burial locations of famous people. With this configuration set, database query process (1210) will retrieve those entries from the database that are within one mile of the user's Smartphone location that are tagged as burial locations of famous people. Location query process (1220) may be further configured to periodically update the user's Smartphone location and send this information to database query process (1210), thereby permitting the Smartphone to receive a periodically updated list of landmarks, memorials, or other points of interest. The periodicity may also be set by the user in configuration process (1240).

Notification process (1230) receives the entries from database query process (1210) and is configured to indicate to the user if one or more entries are nearby to the user, as defined through configuration process (1240). Merely exemplary configurations for notification process (1230) may include the playing of a ringtone, flashing a light, displaying an image on the phone's screen, flashing the screen, or any other suitable configuration. User interface (1250) may be configured to display information relating to the one of more entries, such as an image of the entry, directions to the entry, an address or location of the entry, and/or any other suitable information. If more than one entry is retrieved, a list of entries may be displayed by user interface (1250) for the user to select from. These entries may be categorized by type, such as family-relevant locations, friends, interests, food, gas stations, parks, or other categorizations. Furthermore, user interface (1250) may be configured to allow a user to save or reject each entry, add or reject certain types of entries, and/or review a history of locations the user has visited. Still further configurations for notification process (1230) or user interface (1250) will be apparent to one of ordinary skill in the art in view of the teachings herein.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

Of course, some of the teachings set forth herein are susceptible to being implemented in forms other than computer readable media. For example, based on the teachings of this disclosure, one of ordinary skill in the art could implement a system including a database, a server computer and one or more user computers in which the user computers could be used to provide any or all of the above noted processes while relying on processing done by the server and information stored in the database. Various other methods, machines, and articles of manufacture could also be implemented based on this disclosure by those of ordinary skill in the art without undue experimentation, and should not be excluded from protection by claims included in this or any related document.

Accordingly, instead of limiting the protection accorded by this document, or by any document which is related to this document, to the material explicitly disclosed herein, the protection should be understood to be defined by the claims, which are drafted to reflect the scope of protection sought by the inventors when the terms in those claims, which are listed below under the label "Explicit Definitions," are given the explicit definitions set forth herein, and the remaining terms are given their broadest reasonable interpretation as shown by a general purpose dictionary. To the extent that the interpretation which would be given to the claims based on the above disclosure or the incorporated priority documents is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

Explicit Definitions

When used in the claims, the term "application" or "program" should be understood to mean a program designed to perform a specific function. "Applications" may be programmed in a variety of programming languages and may be configured for use with any device, including, but not limited to, mobile phones, circuit boards, servers, laptops, desktops, netbooks, notebooks, personal digital assistants, portable game consoles and/or any combination of the foregoing.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Computer memory such as hard discs, read only memory, random access memory, solid state memory elements, optical discs and registers is an example of a "computer readable medium."

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft WORD on a computer "configures" that computer to function as a word processor, which it does by using the instructions for Microsoft WORD in combination with other inputs, such as an operating system, and various peripherals (e.g., a keyboard, monitor, etc).

When used in the claims, the term "data" should be understood to refer to an identifiable and distinct entity expressed in a form (e.g., data stored in a computer readable medium) which can be manipulated by a device.

When used in the claims, "database" should be understood be to a collection of data stored on a computer readable medium in a manner such that the data can be retrieved by a computer. The term "database" can also be used to refer to the computer readable medium itself (e.g., a physical object which stores the data).

When used in the claims, "determine" should be understood to mean the act of generating, selecting or otherwise specifying something. For example, to obtain an output as the result of analysis would be an example of "determining" that output. As a second example, to choose a response from a list of possible responses would be a method of "determining" a response.

When used in the claims, the verb "display" refers to the act of providing the thing "displayed" in a visually perceptible form. It should be understood that, in the context of this disclosure, "displaying" refers not only to actually physically presenting a thing on a screen, but also to causing that thing to be presented (e.g., by sending instructions from a local CPU, or by sending information over a network which causes a thing to be "displayed").

When used in the claims, an "element" of a "set" (defined infra) should be understood to refer to one of the things in the "set."

When used in the claims, "interpret" should be understood to refer to a set of information that is converted from a first form, mode, media, language, style, etc. to a second form, mode, media, language, style, etc.

When used in the claims, "periodically" should be understood to refer to the occurrence based at least in part on a temporal trigger. As non-limiting examples, periodic updating of a location might include transmitting and/or receiving location information from a GPS satellite or updating a location based upon the information transmitted and/or received from cellular towers in the area When used in the claims, "process" should be understood to refer to performing one or more mathematical and/or logical operations in order to achieve a result. These one or more mathematical and/or logical operations need not occur on the same device.

When used in the claims, "receive" should be understood to refer to obtaining information about something, whether through the agency of the entity receiving (e.g., by processing data) or through the agency of some other entity (e.g., an external system providing data to the receiving entity).

When used in the claims, "remote" should be understood to refer to the relationship between entities which are physically distant from one another, such as between entities that communicate over a network.

When used in the claims, "send" should be understood to refer to an entity or device making a thing available to one or more other entities or devices. It should be understood that the word sending does not imply that the entity or device sending a thing has a particular destination selected for that thing, thus, as used in this application, a message could be sent using the well known prior art method of writing the message on a piece of paper, placing the paper in a bottle, and throwing the bottle into the ocean. Of course, the above example is not intended to imply that the word sending is restricted to situations in which a destination is not known. Thus, sending a thing refers to making that thing available to one or more other devices or entities, regardless of whether those devices or entities are known or selected by sender.

When used in the claims, the term "set" should be understood to refer to a number, group, or combination of zero or more things of similar nature, design, or function.

When used in the claims, the term "step" should be understood to refer to an action, measure, or process which might be taken to achieve a goal. It should further be understood that, unless an order is explicitly set forth as "necessary" through the use of that word, steps are not limited to being performed in the order in which they are presented, and can be performed in any order, or in parallel.

When used in the claims, the term "storing" used in the context of a memory or computer readable medium should be understood to mean that the thing "stored" is reflected in one or more physical properties (e.g., magnetic moment, electric potential, optical reflectivity, etc) of the thing doing the "storing" for a period of time, however brief.

I claim:

1. An apparatus comprising:
   (a) a memorial structure visibly identifying a specific deceased individual, wherein the memorial structure is positioned at a first geographic location that is separate from a second geographic location of the specific deceased individual; and
   (b) a readable code positioned at the first geographic location with the memorial structure visibly identifying the specific deceased individual and separate from the second geographic location of the specific deceased individual, wherein the readable code when read automatically
      (i) provides a first identifying information that identifies the specific deceased individual and,
      (ii) provides a second identifying information that identifies the second geographic location of the specific deceased individual, to thereby generate directions from the first geographic location having the memorial structure visibly identifying the specific deceased individual and with the readable code to the second geographic location where the specific deceased individual is located.

2. The apparatus of claim 1, wherein the readable code comprises a QR code.

3. The apparatus of claim 1, wherein the readable code is embedded in an RFID tag.

4. The apparatus of claim 1, wherein the second geographic location corresponds to an unmarked burial site.

5. The apparatus of claim 1, further comprising an electronic device operable to interpret the readable code, wherein the electronic device is operable to interpret the second identifying information contained in the readable code.

6. The apparatus of claim 5, wherein the electronic device is configured to provide the directions for traveling to the second geographic location.

7. The apparatus of claim 6, wherein the electronic device is configured provide a perceivable signal to alert a user that the user has arrived at the second geographic location.

8. The apparatus of claim 1, wherein the memorial structure contains biographical information regarding the specific decesed individual, wherein the memorial structure further comprises at least one multimedia region operable to output visual or audio information.

9. The apparatus of claim 1, wherein the memorial structure comprises a memorial wall operable to hold at least one memorial tile.

10. The apparatus of claim 9, wherein the memorial tile includes the name of the specific deceased individual and the readable code near the name of the specific deceased individual.

11. A method of verifying that a user has arrived at a burial site for a specific individual using a portable electronic device and a memorial structure, wherein the memorial structure visibly identifies the specific individual and the memorial structure is positioned at a first geographic location that is separate from a second geographic location of the burial site for the specific individual, the method comprising:
- (a) scanning an identification code with the portable electronic device, wherein the identification code is positioned at the first geographic location with the memorial structure visibly identifying the specific individual and separate from the second geographic location of the burial site for the specific individual, wherein the identification code when read automatically
  - (i) provides a first identifying information that identifies the specific individual and,
  - (ii) provides a second identifying information that identifies the second geographic location of the burial site for the specific individual, to thereby generate directions from the first geographic location having the memorial structure visibly identifying the specific individual and with the identification code to the second geographic location where the burial site for the specific individual is located;
- (b) automatically accessing positioning information corresponding to the second geographic location of the burial site for the specific individual based on the identification code in response to scanning the identification code with the portable electronic device;
- (c) providing the user with instructions for traveling to the burial site for the specific individual from the first geographic location with the memorial structure visibly identifying the specific individual; and
- (d) confirming that the user is at the burial site for the specific individual.

12. The method of claim 11, wherein the act of confirming that the user is at the burial site comprises outputting an audio confirmation.

13. The method of claim 11, further comprising displaying biographical information to the user corresponding to the identification code.

14. The method of claim 11, wherein the act of providing the user with instructions comprises displaying a map to the user showing the user's geographic location and the second geographic location of the burial site for the specific individual.

* * * * *